INVENTOR
HAROLD W. PRICE
BY
ATTORNEY

April 27, 1948. H. W. PRICE 2,440,558
TRANSMISSION OPERATING MECHANISM
Filed Nov. 13, 1940 3 Sheets-Sheet 3

INVENTOR
HAROLD W. PRICE
BY
H. O. Clayton
ATTORNEY

Patented Apr. 27, 1948

2,440,558

UNITED STATES PATENT OFFICE 2,440,558

TRANSMISSION OPERATING MECHANISM

Harold W. Price, South Bend, Ind., assignor to Bendix Aviation Corporation, South Bend, Ind., a corporation of Delaware Application November 13, 1940, Serial No. 365,413

5 Claims. (Cl. 74—472)

This invention relates to motor vehicles and more particularly to improvements in the transmission of power from the engine to the driving wheels of a motor vehicle.

It is customary, in connection with the drive for motor vehicles, to provide a speed ratio changing transmission for varying the driving ratio between the engine and the vehicle driving ground wheels, and my invention is directed to power means automatically operable, when the accelerator or other manually operated engine control means is manipulated to fully or substantially fully open the throttle, to cut out of operation the engine controlling ignition system as the transmission is being power operated to uncouple the engine of the vehicle and the driving wheels thereof and then to so operate the transmission as to lower the speed ratio between the engine and the driving ground wheels and to again render the ignition operative to effect a speeding up of the engine just prior to the completion of said operation of the transmission.

It follows, therefore, that my invention is directed to means for automatically effecting a change in the transmission speed ratio at a time when the internal-combustion engine is incapable, at the then existing setting of the transmission and despite a fully opened position of its throttle, of either maintaining or increasing the speed of the vehicle. Such a lowering of the speed ratio will also probably prevent a choking of the engine should the vehicle be climbing a steep hill.

One of the objects of the invention is to provide, in an automotive vehicle provided with an internal-combustion engine and a selective gear change-speed transmission, power means operable, at or below a predetermined vehicle speed or after the engine throttle has been moved to its wide open position, to successively disable the ignition system of the engine to facilitate a de-meshing of the transmission gears, initiate and substantially complete an operation of the transmission to mesh another set of gears and thereby lower the driving ratio between the engine and the ground wheels of the vehicle and then again render the ignition system operative to speed up the engine just prior to the meshing of the gears. The power means is subsequently operative, after the throttle has been fully closed or substantially closed and only after such a closure, to so operate the transmission as to increase the aforementioned driving ratio.

In carrying out the above object of my invention I have, in a preferred embodiment of my invention, provided a simple and compact pressure differential and spring operated double-acting motor and control valve unit, the control valve being operated and the power element of the motor being held in one of its operative positions by a solenoid controlled either by an accelerator actuated two-part switch or by a governor operated two-part switch. The motor, when energized by the spring, serves first to take up slack in the connection between the power element of the motor and the transmission, then disables the ignition system of the engine by closing a switch and at the same time initiates an operation of the transmission operating means to lower the gear ratio setting of the transmission and lastly opens said latter switch to render the ignition system operative just prior to the completion of said transmission operation.

The principal object of my invention is to provide a transmission operating and ignition controlling motor controlled in part by power means serving, under certain conditions, to maintain the power element of the motor in one of its operative positions and also serving to actuate a valve which controls the operation of said motor.

Yet another object of my invention is to provide an automotive transmission operating and ignition controlling power means including a pressure differential and spring operated motor, a solenoid operated valve for controlling the operation of said motor, a breaker switch operated by said motor and electrical means connected with said latter switch and operative to control the operation of said solenoid, said electrical means including a switch, operated by a vehicle speed responsive governor, and an accelerator operated switch connected in series with the solenoid and governor operated switch and further including a governor operated switch and an accelerator operated switch connected in parallel in their connection. The parts of the mechanism are so constructed and so interconnected as to effect a pressure differential operation of said motor when the accelerator is fully released and the vehicle is travelling at or above a certain speed and also to effect a spring operation of said motor with a consequent operation of the breaker switch when either the accelerator is depressed to or beyond a certain position in its throw or the speed of the vehicle is reduced to or below a certain value.

Other objects of the invention and desirable details of construction and combinations of parts will become apparent from the following description of certain embodiments, which description is taken in conjunction with the accompanying drawings, in which.

Figure 1:
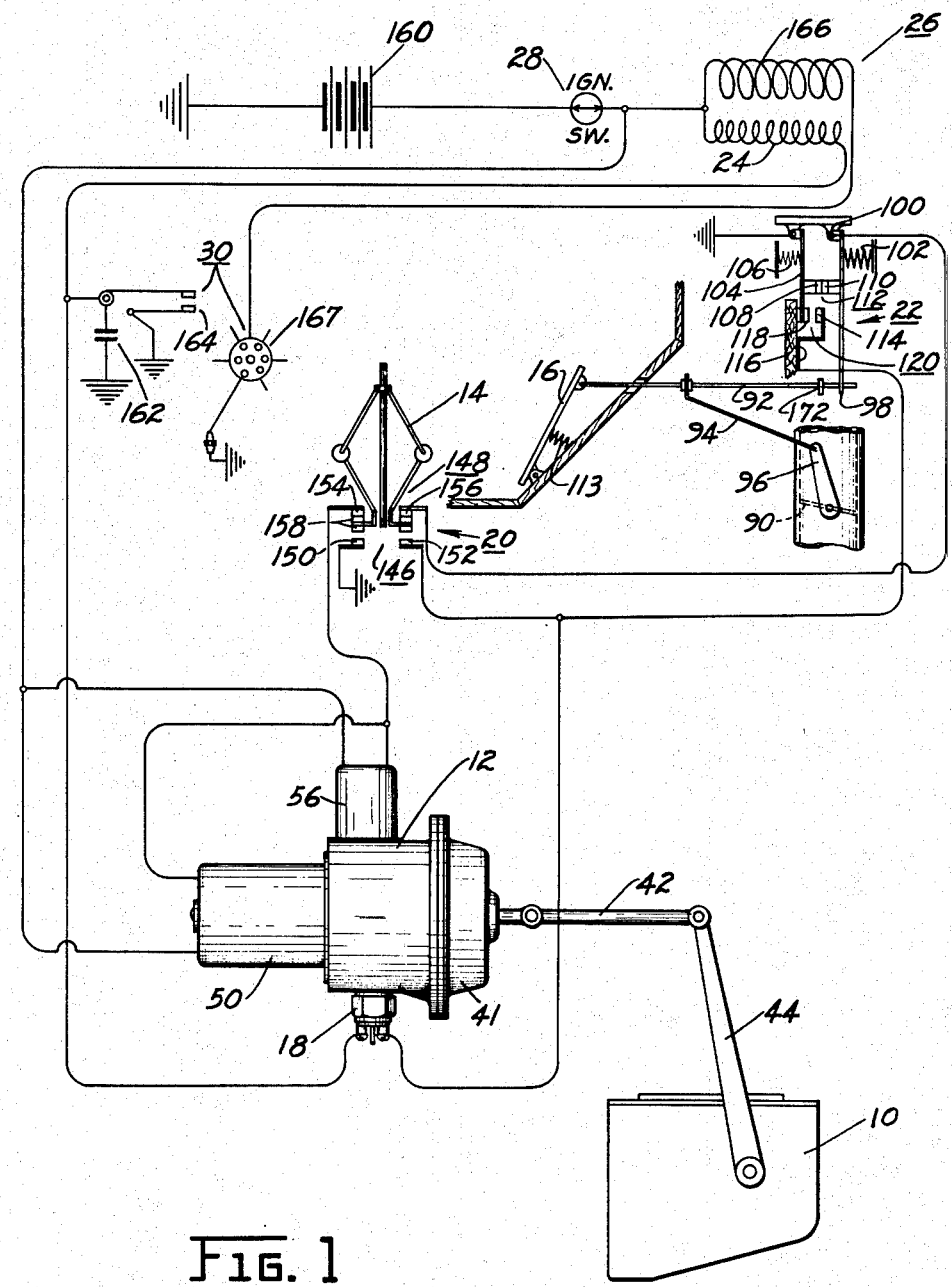
Figure 1 is a diagrammatic plan view disclosing a transmission operating and ignition controlling system as a whole, the motor unit of which constitutes my invention.

Referring to Figure 1 of the drawings, diagrammatically disclosing an embodiment of my invention, the reference numeral 10 indicates a power operated two-speeds forward selective gear transmission mechanism which may be placed ahead of or to the rear of a manually operated selective gear or step type of transmission in the power transmission mechanism of an automotive vehicle, or this power operated transmission may be combined with the manually operated transmission as a single transmission unit. The manually operated step transmission may be omitted and the transmission 10, modified to include a manually operated reverse gear, may be combined with the rear axle mechanism of the vehicle to provide what is known in the art as a two-speed rear axle. If a manually operated step transmission is incorporated in the transmission system, then a manually or power operated friction clutch may be included in said system.

The transmission 10 includes a drive shaft and a driven shaft, not shown, and should said transmission be placed ahead of a manually operated transmission, not shown, then the drive shaft is connected to a clutch, not shown, and the driven shaft is connected to the drive shaft of the manually operated transmission. Should the transmission 10 be placed to the rear of a manually operated transmission, then the drive shaft of the transmission 10 is connected to the driven shaft of the latter transmission and the driven shaft of the transmission 10 is connected to the propeller shaft of the vehicle.

My invention is, however, particularly directed to power means controlled either by the throttle controlling means or by a vehicle speed-responsive governor or both, depending upon the particular operation desired, said power means serving to operate any type of transmission that will alternately effect an increase and a decrease of the speed ratio between the engine and the driving ground wheels of the vehicle. The power means of my invention also serves to, in part, control the operation of the engine controlling ignition system to facilitate the operation of the change-speed transmission by said power means. It follows, therefore, that it is within the purview of my invention to employ a two-speeds forward planetary transmission. However, I prefer to employ a selective gear type of two-speeds forward transmission cooperating with a manually operated selective gear transmission, a fluid clutch and a friction clutch, the two clutches and manually operated transmission being interposed between the engine and the first mentioned transmission in the power transmitting mechanism of the vehicle.

It is particularly desirable that the transmission operating and ignition controlling power means of my invention be incorporated in an automotive vehicle equipped with a fluid coupling type of clutch for transmitting the drive from the internal-combustion engine of the vehicle to the change-speed transmission mechanism. Such a clutch, which is well known to those skilled in this art, constitutes a yieldable connection between the engine and the drive shaft of the change-speed transmission and at all times during the operation of the engine serves as a force-transmitting medium. Inasmuch as the clutch or coupling will slip until the speed ratio of the rotor and stator elements of the clutch is 1 to 1 and inasmuch as with such a clutch there is no clutch disengaging operation to be effected, it follows that the fluid clutch will facilitate an operation of the selective change-speed transmission mechanism to the rear of the clutch and it also follows that such a mechanism may be simplified by reducing the number of driving ratio settings thereof. Accordingly, the change-speed transmission of the vehicle may be limited to the simple two-speed selective gear transmission 10 disclosed in Figure 1. However, to facilitate a starting of the vehicle when the same is, say, mired in soft ground or when, for any other reason, the load to be driven is relatively heavy, the transmission 10 may, as heretofore mentioned, be supplemented by a friction clutch and the aforementioned selective gear transmission mechanism, the latter being manually operated to select a relatively low speed ratio between the engine and the vehicle driving wheels or propeller shaft. Such a manually operated supplemental selective transmission may, after the friction clutch is disengaged, be adjusted to place the transmission in neutral, that is, disconnect the engine or other prime mover from the driving ground wheels. Such a neutral setting, in a vehicle provided with a fluid clutch, will obviate an undesired creeping of the vehicle after it has been brought to a stop and will also obviate a possible stalling of the engine should the viscosity of the oil or other power-transmitting medium of the clutch be unduly increased by cold weather.

Describing now the transmission operating and ignition controlling power means constituting the essence of my invention, the principal elements of the same are diagrammatically disclosed in Figure 1 and include a spring and pressure differential operated motor and valve unit 12 controlled by a vehicle speed-responsive governor 14 and by the accelerator 16 of the vehicle. As will be described hereinafter, a motor operated or interrupter switch 18, a two-part governor operated switch mechanism 20, an accelerator operated two-part switch mechanism 22, and wire interconnecting said switch mechanisms with the primary winding 24 of an ignition coil 26 and with an ignition switch 28 constitute electrical means operative to successively cut out and cut in a distributor 30 as a step-down operation of the transmission is being effected. The ignition coil and distributor constitute two of the principal parts of the engine controlling ignition system, which is of conventional design.

Figure 2:
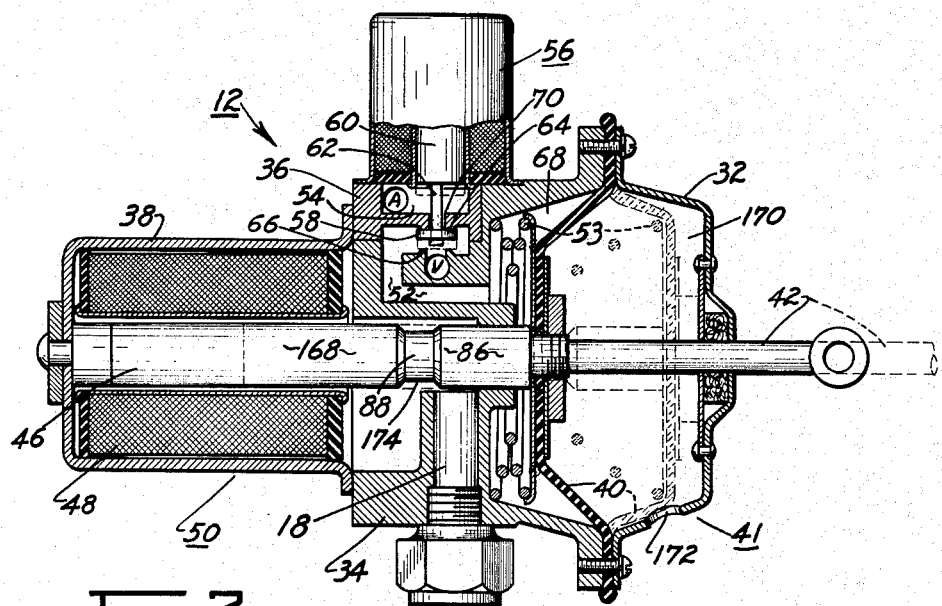
Figure 2 is a longitudinal sectional view of the transmission operating and ignition controlling motor unit constituting one embodiment of my invention.

Referring to Figure 2 of the drawings, disclosing in detail the motor and valve unit 12, the same includes a multi-sectioned casing including parts 32, 34, 36 and 38 housing a flexible diaphragm 40, constituting the power element of a pressure differential and spring operated double-acting motor described in greater detail hereinafter and indicated by the reference numeral 41. To this diaphragm 40 there is secured a connecting rod 42 connected at its end to a crank 44 which actuates the transmission 10. A switch operating rod 46 is secured to said diaphragm and connecting rod and extends within a winding 48. That portion of the rod 46 which extends within the winding 48 constitutes an armature, the armature and winding together constituting a solenoid indicated as a whole by the reference numeral 50. A relatively heavy spring 53, interposed between the casing part 34 and the diaphragm 40, serves to move the diaphragm and the crank 44 connected thereto to the right to establish the transmission in its low gear setting, all of which will be described in detail hereinafter.

The casing parts 34 and 36 are recessed to provide compartments 52 and 54 and a valve operating solenoid 56 is fixedly mounted upon said casing parts. A valve 58 is connected to the armature 60 of the solenoid 56 by a pin 62, said valve being seated upon either seat 64 or seat 66. If the solenoid 56 is energized the valve 58 is moved to the full line position disclosed in Figure 2 upon its seat 64 thereby interconnecting the intake manifold of the engine or other source of vacuum with a compartment 68 of the motor 41 via the compartment 52 and a duct V connected at one of its ends with a conduit, not shown, leading to said vacuum source. The valve 58 is then in its open position. If the solenoid 56 is deenergized the valve 58 is moved by a spring, not shown, biasing the armature 60 and the valve connected thereto to the position disclosed in dotted lines in Figure 2. The valve is then seated upon seat 66 and is said to be closed. The compartment 68 of the motor 41 is then vented to the atmosphere via the compartment 52, an opening 70 in the casing part 36, the compartment 54 and a duct A bored in said casing part. The casing part 32 and a portion of the casing part 34 together with the diaphragm 40 and the spring 53 constitute the aforementioned double-acting motor 41, said motor being controlled by the above described valve mechanism, the operation of which will be described in greater detail hereinafter. This valve mechanism may be termed a three-way mechanism, inasmuch as the valve 58 controls the air transmitting passages connected to the atmosphere, the source of vacuum and the motor 41.

Figure 6:
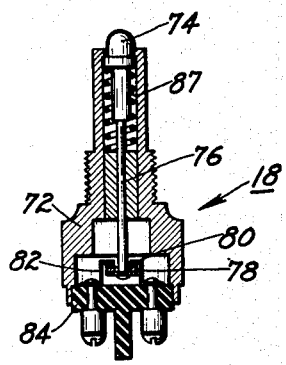
Figure 6 is a sectional view of the ignition controlling breaker switch housed within the aforementioned motor unit.

Referring to Figure 6 disclosing the details of the interrupter switch 18, the same includes a two-part casing 72 housing a spring pressed member 74 and a pin 76 slidably mounted in the casing. The pin 76 is secured to the member 74 and to one end of said pin there is secured a contact member 78. Contacts 80 and 82 are secured to a base portion 84 of the switch, said base portion being constructed of insulating material. This switch is opened when the member 74 is contacted by a full-bodied portion 86 of the rod 46 to compress a spring 87 and is in its closed position when the said rod is moved to register said member with a small-bodied or recessed portion 88 in said rod. In the latter position of the switch operating rod 46 the spring 87 functions, through the intermediary of the pin 76 and member 74, to move the contact member 78 to the position disclosed in Figure 6, thereby closing the switch.

Referring again to Figure 1 the accelerator 16 of the vehicle is operably connected to the throttle or butterfly valve 90 of the carburetor by force transmitting means including links 92 and 94 and a crank 96. One end of the link 92 is slidably mounted within the end of a lever 98 fulcrumed at 100 and biased to the left, Figure 1, by a relatively heavy spring 102.

Continuing the description of the accelerator operated two-part or double switch mechanism 22 a lever 104 which is wired to ground is biased to the right, Figure 1, by a relatively light spring 106 which is weaker than the spring 102. Contacts 108 and 110 are secured respectively to the levers 104 and 98 and together constitute one of the switches of the accelerator operated switch mechanism 22. This switch which is grounded is indicated by the reference numeral 112. The spring 102, being stronger than the spring 106 maintains the contacts 108 and 110 in abutment to close the switch 112 when, as disclosed in Figure 1, the accelerator is returned to its throttle closed position by a spring 113. A contact 114, secured to a support 116 of insulating material, together with a contact 118 secured to one end of the lever 104, constitutes the other of the two switches operated by the accelerator and this latter switch is, as disclosed in Figure 1, open when the accelerator is released; this switch is indicated by the reference numeral 120.

Figure 4:
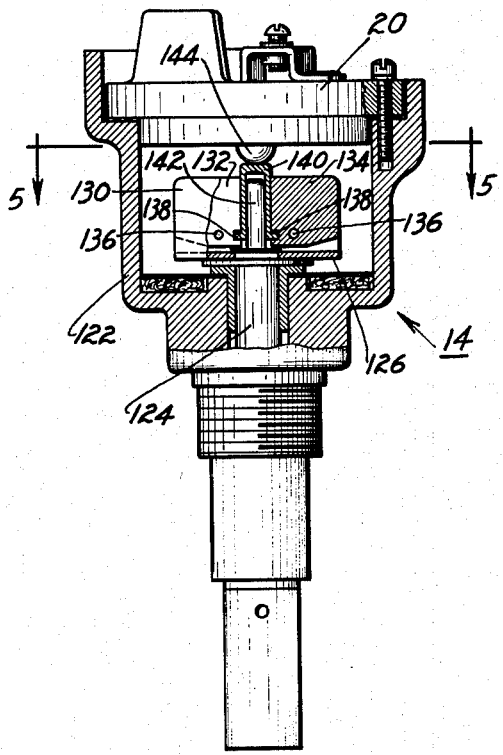
Figure 4 is a sectional view disclosing the details of the vehicle speed responsive governor constituting one feature of my invention.
Figure 5:
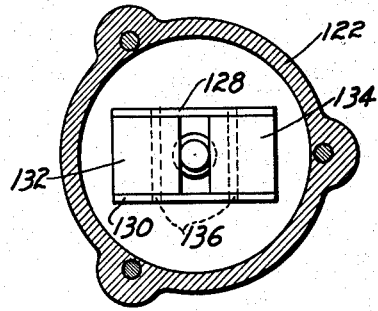
Figure 5 is a sectional view of a governor mechanism taken on line 5—5 of Figure 4.

Referring to Figures 4 and 5, the governor 14 and its two-part or double switch mechanism 20 includes a casing 122 housing a rotatable pin 124 driven by a cable, not shown. This cable is so drivably connected to a part of the power transmission of the vehicle as to rotate at a speed which is directly proportional to the speed of the vehicle. To the pin 124 there is secured a plate 126 and to the edges of said plate there are secured plates 128 and 130. Centrifugally operated weights 132 and 134 are rotatably mounted upon pins 136 which extend through the weights and into the plates 130 and 128. A flange 138 at the base of a hollow pin 140 fits within recesses in the weights 132 and 134, said pin being sleeved over a pin 142 secured to the plate 126. At its upper end the pin 140 contacts a switch operating member 144. Upon rotating the pin 124 the centrifugal force to which the weights 132 and 134 are subjected effects an angular movement of said weights thereby forcing the pin 140 upwardly to first open a switch 146 and then close a switch 148, said switches being diagrammatically disclosed in Figure 1. Switch 146 includes a grounded contact 150 and a contact 152 and switch 148 includes contacts 154 and 156 both switches having an element in common in a governor operated contact member 158. The above described opening and closing operation of the switch mechanism 20 occurs at, say, a vehicle speed of five miles per hour; however, said mechanism may be adjusted to operate at a different speed.

The grounded accelerator operated switch 112 is wired in series with the governor operated switch 148, the valve operating solenoid 56 and the ignition switch 28 of the vehicle, the latter being wired to a battery 160. Accordingly, the accelerator operated switch 112 and the governor operated switch 148 constitute the means for controlling the operation of the valve operated solenoid 56, said solenoid being energized to move the valve 58 to its open position when the accelerator is released and the speed of the vehicle is sufficiently high to close the switch 148.

Describing now the aforementioned ignition controlling electrical means, the interrupter switch 18 is wired in series with primary winding 24 of the ignition coil 26 and with the switch 120 of the grounded accelerator operated switch mechanism. The distributor 30 of the ignition system includes, of course, a grounded condenser 162, a breaker switch 164 and a rotor 167 wired to the several grounded spark plugs, only one of which is disclosed. As disclosed in Figure 1, the interrupter switch 18 is also wired in series with the switch 146 of the governor operated switch mechanism 20. Completing the description of the conventional ignition system disclosed in Figure 1, the primary winding 24 of the ignition coil 26 is wired in series with the ignition switch 28 and the breaker switch 164 of the distributor, and a secondary winding 166 of the ignition coil is wired in series with the rotor 167 and said ignition switch.

Describing now the operation of the mechanism constituting my invention, and incidentally completing the description of the details thereof, when the vehicle is at a standstill the transmission 10 is automatically placed in its low gear setting. The interrupter switch 18 is at this time open, for the diaphragm 40 of the motor 41 is in the dotted line position disclosed in Figure 2 and a full bodied portion 168 of the switch operating rod 46 is in contact with the member 74 to depress the same. The diaphragm 40 takes this position at this time because the valve 58 is then in its closed position as disclosed in dotted lines in Figure 2; accordingly, the compartment 68 of the motor 41 is vented to the atmosphere. Explaining the fact that the valve 58 is closed, it is to be noted that the valve operating solenoid 56 is de-energized when the car is at a standstill; for the governor operated switch 148 is then opened, thereby breaking the circuit to ground said solenoid. Now when the motor compartment 68 is vented to the atmosphere the spring 53 expands to move the diaphragm 40 to the right, Figure 2, thereby actuating the crank 44 and placing the transmission 10 in low gear.

Assuming now that the driver of the car desires to get under way, all that is required of him is to depress the accelerator, assuming of course, that the engine is idling. The car then moves forwardly, the acceleration depending of course upon the degree of depression of the accelerator. If, as suggested supra, the car is equipped with a manually operated three speeds forward and reverse transmission and a fluid clutch, then the driver may, prior to starting the vehicle in motion, place said transmission in high gear, for the then existing low gear setting of the transmission 10 coupled with the operation of the fluid clutch makes it possible to effect a smooth start when the manually operated selective transmission is in high gear. Thereafter, under all normal driving conditions, there is no need to change this setting of the manually operated transmission.

Continuing the description of the operation of the mechanism constituting my invention, when the desired speed of the vehicle is reached the driver then of course releases the accelerator. The throttle is thus moved toward its closed position and when the same is, say, three-fourths closed there is created sufficient vacuum in the intake manifold of the car to make possible an energization of the motor 41 to place the transmission 10 in its high gear setting. However, in order to effect this energization, it is necessary to open the valve 58 to the position disclosed in full lines in Figure 2 and this is accomplished by releasing the accelerator sufficiently to permit the spring 102 to open the switch 120 and close the switch 112. Closing of the switch 112 completes the electrical circuit to energize the valve operating solenoid 56, assuming that the speed of the vehicle exceeds the aforementioned predetermined speed of five miles per hour, for the governor 14 then functions to close switch 148 and open switch 146. Now when the solenoid 56 is energized the valve 58 is as stated above, moved to the position disclosed in full lines in Figure 2, thereby cutting off the air transmitting connection between the compartments 52 and 54 and completing an air transmitting connection between the manifold or other source of vacuum and the compartment 68 of the motor 41 via the compartment 52, duct V and the conduit, not shown, connecting said duct with the source of vacuum.

The motor compartment 68 having been connected to the partially evacuated manifold is immediately partially evacuated, thereby initiating a movement of the diaphragm 40 to the left, Figure 2, to place the transmission 10 in its high gear setting. Completing the description of this operation, a compartment 170 of the motor 41 is at the time vented to the atmosphere via an opening 172 in the casing part 32. The diaphragm 40 is thus subjected to a differential of pressures and the resulting load effects the aforementioned movement of the diaphragm to the left to move the connecting rod 40 and rotate the crank 44 to place the transmission 10 in its high gear setting.

Describing another feature of my invention, when the accelerator is released to effect the high gear setting of the transmission the torque or driving force of the engine is appreciably reduced and this reduction facilitates the demeshing of the gears establishing the second speed setting of the transmission 10. This reversal of torque also facilitates the operation of meshing the gear teeth of the transmission 10 to establish said transmission in high gear. A free-wheeling unit may be incorporated in the power transmission mechanism to the rear of the change-speed transmission or transmissions and such a unit will also facilitate the aforementioned gear changing operations. Furthermore, the fluid clutch will aid in these operations.

Now, it is necessary to maintain the diaphragm 40 in the vacuum operated position disclosed in full lines in Figure 2, for otherwise, upon depressing the accelerator short of a position to open the switch 112 the manifold vacuum might drop sufficiently to effect an undesired movement of the diaphragm to the right, Figure 2, by the spring 53 with a resultant setting of the transmission 10 in low gear. To prevent this operation there is provided the solenoid 50 which functions, when energized, as a holding means to maintain or load the diaphragm 40 in its high gear position thereby supplementing the then existing differential of pressures tending to hold said diaphragm in said position. Referring now to Figure 1 it will be noted that when the governor 14 is operative to close the switch 148, that is when the car speed is above five miles per hour, and when the accelerator has been released sufficiently to close the switch 112 then the solenoid 50 is energized and so long as it remains energized, it holds the diaphragm 40 in its high gear position. As disclosed in Figure 1 the diaphragm holding solenoid 50 is wired in parallel with the valve operating solenoid 56 in the circuit interconnecting the ignition switch 28, the battery 160, the governor operated switch 148 and the accelerator operated switch 112.

There is thus provided power means, that is the solenoid 50 or its equivalent, operative to insure a high gear setting of the transmission 10 until either the speed of the vehicle is decreased below a predetermined factor or the accelerator is depressed sufficiently to open the switch 112 and permit a closing of the switch 120. The incorporation of this power means in the motor unit constitutes one of the most important features of my invention.

The high gear setting of the transmission 10 having been established by releasing the accelerator sufficiently to energize the motor 41 by vacuum, the driver will then depress the accelerator to maintain or increase the speed of the vehicle. However, as described above, the diaphragm 40 and linkage connected thereto will not be power operated by the spring 53 to again place the transmission 10 in low gear until the accelerator is sufficiently depressed to effect a closing of the switch 120.

We will now assume that the vehicle is driven into hilly country and the driver fully depresses the accelerator in order to increase the driving torque of the engine and thereby maintain a relatively high vehicle speed or increase the speed of the vehicle to make it unnecessary to shift gears. As to the latter operation, it is assumed that a manually operated two-speeds forward and reverse transmission is combined with the automatically operated two-speeds forward transmission 10 disclosed in Figure 1. Now, obviously, it is best not to so unduly tax the engine, and with the mechanism of my invention such an operation is unnecessary, for upon depressing the accelerator to open the switch 112 and close the switch 120, the transmission 10 is automatically operated to lower the driving ratio between the engine and the driving wheels of the vehicle, that is, establish the low gear setting of the transmission. If the vehicle is also equipped with a manually operated transmission, this operation of the transmission 10 makes it unnecessary to shift the gears of the manually operated transmission.

Describing this operation, when the accelerator is almost fully depressed a stop 172 fixedly mounted on the link 92 moves into contact with the end portion of the lever 98. Accordingly, the final increment of the throttle opening movement of the accelerator serves to open the switch 112 and permit the spring 106 to close the switch 120, thereby again deenergizing the solenoids 50 and 56. The armature 60 of the solenoid 56 is thus again moved downwardly by the spring, not shown, and the valve 59 is moved to its seat 66 to the position disclosed in dotted lines in Figure 2. As previously described, this operation results in a venting of the motor compartment 68 to the atmosphere.

The venting of the compartment 68 and the deenergization of the solenoid 50 will permit the compressed spring 53 to again move the diaphragm 40 to the right, Figure 2, to again establish the transmission 10 in its low gear setting.

Describing now another feature of my invention, that is the cycle of operations effected by the expanding of the spring 53 as a power means, during the first increment of movement of the spring operated diaphragm, the lost motion in the force transmitting linkage interconnecting the diaphragm and the transmission gears is taken up. It is, of course, true that all such linkage including that within the transmission is subject to appreciable wear and tear resulting in lost motion between the several parts thereof, and there is always some lost motion in this linkage when the original installation is made despite every effort to make a tight fit. As this lost motion is being taken up the switch operating rod 46 is being moved to the right, Figure 2, until the member 74 is positioned immediately adjacent the small bodied portion 88 in said rod. This portion provides a recess 174 receiving the switch operating member 74. Now when this rod has moved sufficiently to register the recess 174 with the member 74, then the switch 18 is closed as disclosed in Figure 6. The construction and arrangement of the parts, including the depth and length of the recess 174 and the position of the member 74 within the recess when the diaphragm 40 is being held by the solenoid 50 in its vacuum operated position, are such as to insure a closing of the switch 18 at substantially the same time that the demeshing movement of the transmission gear teeth is initiated. Now when the switch 18 is closed, the electrical ground connection to the switch 120 is completed, for at this time the driver is maintaining said switch closed by maintaining the accelerator depressed. The current flowing from the primary winding 24 to the breaker switch 164 is thus appreciably reduced. In fact, it is so reduced as to disable the distributor 30 and cut the ignition system out of operation.

The disabling of the ignition system, of course, renders the internal-combustion engine inoperative as a source of power, thereby reversing the driving torque. In other words, the moving vehicle then drives the driven shaft of the transmission 10, and the driving shaft of said transmission slows down due to cutting the engine out of operation. This operation, that is the operation of rendering the engine inoperative, facilitates the operation of demeshing the gear teeth establishing the high gear setting of the transmission, for the latter teeth are no longer being forced into driving contact with each other. If through faulty construction or normal wear of the transmission the parts are so constructed and arranged as to fail to effect the aforementioned operation, resulting in an initiation of this demeshing operation slightly before or after the switch 18 is closed, the presence of the fluid clutch, a yieldable connection, will facilitate this demeshing operation. It also follows that if, instead of the change-gear transmission 10, some other type of transmission is used, disabling the internal-combustion engine and reversing the driving torque will facilitate an uncoupling operation of the driving and driven elements of said transmission, and such a disabling operation will facilitate a demeshing of the gears even though the fluid clutch be omitted and the connection of the engine with the transmission be effected only by a manually operated clutch.

Continuing the description of the cycle of operations effected by the spring 52, as the diaphragm moves to the right the construction and arrangement of the parts including the length of the recess 174 is such that the switch 18 remains closed to effect a disabling of the engine until the operation of meshing the gear teeth of the transmission to place the same in low gear is initiated. If the transmission is provided with a synchronizing mechanism the parts may be so constructed and arranged as to maintain a closing of the switch 18 until the synchronizing mechanism has completed its operation. The switch 18 is then again opened when the full bodied portion 168 of the rod 46 contacts the member 74 and this reopening of the switch results in restoring the ignition system to operation. Accordingly, the operation of the engine is resumed at the same time or substantially the same time that the transmission 10 is being meshed in high gear. This is, however, exactly the operation desired for speeding up the engine obviates the undesirable deceleration or surge of the vehicle that would result if a vehicle picked up the load of a dead engine.

The function of the recess 174 is to be particularly stressed, for by virtue of this recess the initiation of the ignition interruption operation is delayed until the slack in the system is taken up, and the above-described demeshing operation is initiated. This delay results in reducing the length of time during which the ignition is interrupted. It is, of course, desirable to make this period of interruption just as short as possible, for otherwise the exhaust manifold of the engine may fill up with unburnt combustible gas, which will result in a back fire when the operation of the ignition system is resumed. The recess 174 may be omitted and the same result obtained by positioning a recess anywhere in the force transmitting linkage interconnecting the diaphragm 40 and the transmission. In this case the switch 18 would, of course, be positioned adjacent the slot.

Completing the description of the operation of the mechanism constituting my invention, after placing the transmission 10 in low gear by depressing the accelerator to its wide open throttle position, the driver will probably keep the accelerator in this position until the vehicle has reached the top of the hill. If this operation is effected on level ground, the driver will probably maintain the accelerator depressed until the desired vehicle speed is obtained. Upon releasing the accelerator, the transmission will remain in low gear, as previously described, until the accelerator is released sufficiently to again energize the motor 41 to effect a high gear setting of the transmission. When bringing the vehicle to a stop the governor 14 will open the switch 148 and close the switch 146 to effect a low gear setting of the transmission, this operation taking place at a relatively low vehicle speed, depending of course, upon the setting of the governor and the switch mechanism operated thereby.

Briefly describing this operation, the electrical circuit to the valve operating solenoids 50 and 56 is broken when the switch 148 is opened and an electrical circuit including the interrupter switch 18 is completed via the closed governor operated switch 146 which is grounded. The motor 41 is then automatically again energized by the spring 53 to place the transmission 10 in low gear and the ignition is successively interrupted and its operation resumed, all as previously described.

Figure 3:
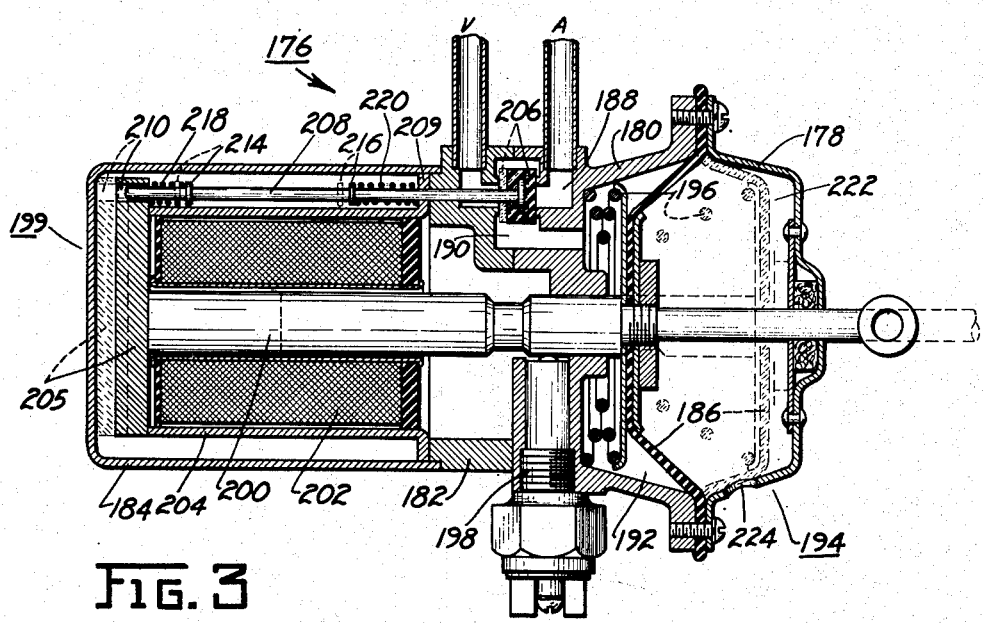
Figure 3 is a view, similar to Figure 2, disclosing the preferred embodiment of the transmission operating and ignition controlling motor unit of my invention.

There is disclosed in Figure 3 the preferred embodiment of my ignition controlling and transmission operating motor and valve unit. This unit, indicated in general by the reference numeral 176, includes casing members 178, 180, 182 and 184 and a diaphragm type of power element 186. The casing members 180 and 182 are recessed to provide compartments 188 and 190 through which the air passes as it flows into or from a compartment 192 of the motor. This motor, which is indicated in general by the reference numeral 194, includes the casing member 178, a portion of the casing member 180, the diaphragm 186 and a relatively heavy spring 196, the operation of which is described hereinafter.

Within the casing member 180 there is housed an ignition controlling breaker switch 198, the same being a duplicate of the above described breaker switch 18, and within the casing member 184 there is housed a valve operating and diaphragm holding solenoid 199 including an armature 200 and a winding 202 housed within a tubular casing member 204. This solenoid also includes an armature plate 205.

The operation of the motor 194 is controlled by a valve 206 to which is secured a pin 208 extending from one end of the solenoid casing member 204. The end of the pin 208 extends within an opening 210 in the armature plate 205. Stops 214 and 216 are secured to the pin 208 and a relatively heavy spring 218 is sleeved over said pin between the plate 212 and the stop 214. A spring 220, lighter than the spring 218 is sleeved over the pin 208 between the stop 216 and the flange 209. As to the wiring interconnecting the solenoid 199 and breaker switch 198 with the accelerator operates switches, the governor operated switches and the ignition system of the engine this wiring duplicates that disclosed in Figure 1 with the exception, of course, that the wiring connected directly to the solenoid 56 of Figure 1 is omitted.

Briefly describing the operation of the power unit disclosed in Figure 3, when the accelerator is released and the vehicle is travelling above a predetermined speed, say five miles per hour, the solenoid 199 is energized resulting in the armature plate 205 being drawn to the right to the position disclosed in full lines in said figure. The pin 208 is thus moved to the right to compress the spring 220 and move the valve 206 to its open position, that is the position disclosed in full lines in Figure 3. The compartment 192 of the motor 194 is then partially evacuated by virtue of the passage of air from said compartment via compartments 190 and 188 and duct V leading to the intake manifold of the engine or to any other source of vacuum. In this operation the spring 220, which as described above is lighter than spring 218, is compressed before the spring 218 is compressed. It follows therefore that when the solenoid 199 is deenergized the spring 218 will expand before the spring 220 expands. These springs may be said to be in series in the force transmitting means interconnecting the valve 206 and the armature plate 205.

The partial evacuation of the compartment 192 results in the movement of the diaphragm 186 to the left to the position disclosed in full lines in Figure 3, for a compartment 222 of the pressure differential and spring operated motor 194 is at the time vented to the atmosphere via an opening 224 in the motor casing member 178. The diaphragm 186 is therefore subject to a differential of pressures resulting in its movement to the left to establish the transmission 10 in its high gear setting.

Now the energization of the solenoid 199 also results in the positioning of the armature 200 as disclosed in full lines in Figure 3, that is said armature is drawn to the left into the winding 202 when the current is passed through said winding, and the armature 200 remains in this position to hold the transmission in its high gear position so long as the solenoid 199 remains energized. In this position of the armature 200 the breaker switch 198 is opened, this operation being previously set forth in describing the operation of the power means disclosed in Figure 2, for as will be apparent from an inspection of Figures 2 and 3 the switch 198 of the mechanism of Figure 3 operates in the same manner as the switch 18 of the mechanism of Figure 2.

Now, when the driver wishes to place the transmission 10 in low gear the accelerator is depressed and, as previously described, this results in a deenergization of the solenoid 199. As heretofore described the springs 218 and 220 then successively expand resulting in the movement of both the valve 206 and the armature plate 205 to the positions disclosed in Figure 3 in shaded lines. The compartment 192 of the motor 194 is thus vented to the atmosphere via a duct A and compartments 188 and 190 and the spring 196 then functions to move the diaphragm 186 to the position disclosed in dotted lines in Figure 3 to establish the transmission 10 in low gear. As the diaphragm moves to the right the breaker switch 198 is kept open, then closed and again opened to control the ignition system, all as previously described. It is also to be noted that in this operation, by virtue of the successive operations of the springs 218 and 220, there is a slight delay in closing the valve 206, that is moving said valve to vent the compartment 192 to atmosphere. This delay, however, does not unduly delay the operation of the motor 194 to effect the low gear or socalled kickdown operation of the transmission 10; for when the driver, to effect this operation of the motor 194, depresses the accelerator beyond its throttle wide open position, the gaseous pressure in the intake manifold is increased, that is the degree of vacuum is lowered thereby increasing the gaseous pressure in the motor compartment 192 and initiating the aforementioned kickdown operation by an expansion of the spring 196.

There is thus provided a simple and compact transmission operating and ignition controlling power means, including a pressure differential and spring operated motor. This power means is operable, after the accelerator is substantially depressed or after the speed of the vehicle is reduced below a predetermined factor, to successively take up slack in the connection between the power element of the motor and the transmission, then disable the internal-combustion engine, thereby reversing the driving torque in the power transmission system of the vehicle, and at the same time, aided by the operation of a fluid clutch, operate the transmission to uncouple the driving and driven elements thereof, then, with the aid of the fluid clutch, continue the operation of the transmission to effect a synchronization of the driving and driven parts thereof and, lastly, restore the engine to operation as the transmission is being operated to effect the low speed ratio setting thereof. Upon release of the accelerator and above a predetermined vehicle speed, the power means functions to again place the transmission in high gear.

One of the most important features of my invention lies in the provision of the power means within the motor and valve unit, said power means being operative to actuate the motor controlling valve and to hold the power element of the motor in its high gear position until a low gear operation of said motor and valve unit is effected by either reducing the speed of the car below a predetermined factor or by depressing the accelerator to or beyond a certain position.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. A power actuator for an automotive vehicle change speed transmission comprising a motor including a casing and a power element, valve means for controlling the operation of said motor, and power means including a solenoid for operating said valve means and further including a holding coil operative, when energized, to supplement an operation of the motor to maintain said power element in a certain position.

2. A power actuator for operating an automotive vehicle change speed transmission and in part controlling the operation of the ignition system of the vehicle to facilitate the operation of the transmission, said actuator comprising a pressure differential and spring operated motor unit comprising a casing and a power element, a power element operated switch housed within said motor unit and constituting a part of the means for controlling the aforementioned ignition system, valve means for controlling the operation of said motor, and power means operable both to actuate said valve means and, when energized, to supplement a pressure differential operation of the motor unit to maintain said power element in a certain position, said latter power means including a solenoid for actuating the valve means and another solenoid housed within said motor unit for maintaining the power element in said certain position.

3. In an automotive vehicle provided with an accelerator, a vehicle speed responsive governor, a change-speed transmission and an ignition system, power means for operating said transmission and in part controlling the operation of the ignition system, said power means including a pressure differential and spring operated motor, a valve for controlling the operation of said motor, a solenoid for actuating said valve, an ignition controlling breaker switch operated by said motor, electrical means for controlling the operation of said solenoid including an accelerator operated switch and a governor operated switch, both wired in series with said solenoid, said power means further including a grounded governor operated switch wired to the breaker switch and an accelerator operated switch wired to said breaker switch, said aforementioned mechanism being so constructed and so interconnected as to effect a pressure differential operation of said motor when the accelerator is fully released and the vehicle is travelling at or above a certain speed and also to effect a spring operation of said motor, with a consequent operation of the breaker switch, when either the accelerator is depressed to or beyond a certain position in its throw or the speed of the vehicle is reduced to or below a certain value.

4. A power actuator for an automotive vehicle change speed transmission comprising a fluid pressure and spring operated motor, a valve for controlling the operation of said motor, a solenoid for actuating said valve and another solenoid housed within the motor and operative when and only when energized, to hold the power element of said motor in one of its operative positions, said solenoids being so electrically interconnected that the same are both energized at the same time and are both deenergized at the same time.

5. In an automotive vehicle provided with a change speed transmission, an accelerator, a vehicle speed responsive governor and an ignition system: power means for operating said transmission and in part controlling the operation of the ignition system, said power means including a pressure differential and spring operated motor having a power element operably connected to the transmission, a valve for controlling the flow of fluid to and from said motor to thereby control the operation of said motor, a solenoid for operating said valve, electro-magnetic means within said motor operative to hold said power element in one of its operative positions and by said action supplementing a pressure differential operation of said element, electrical means, including a switch mounted within said motor, for momentarily disabling the ignition system to facilitate one of the transmission operating operations of said power means, and means for controlling the operation of the power means comprising switch mechanism electrically connected to the electromagnetic power element holding means, to the valve operating solenoid and to the aforementioned ignition controlling switch, said switch mechanism being operated by the aforementioned accelerator and governor.

HAROLD W. PRICE.

REFERENCES CITED

The following references are of record in the file of this patent:

UNITED STATES PATENTS

| Number | Name | Date |
|---|---|---|
| 1,836,813 | Rankin | Dec. 15, 1931 |
| 1,911,599 | Bloxsom | May 30, 1933 |
| 1,958,646 | Snavely | May 15, 1934 |
| 2,039,186 | Pieper | Apr. 28, 1936 |
| 2,051,553 | Fleischel | Aug. 18, 1936 |
| 2,084,424 | Bauman | June 22, 1937 |
| 2,096,745 | Howard | Oct. 26, 1937 |
| 2,214,099 | Claytor | Sept. 10, 1940 |
| 2,225,493 | Barnes | Dec. 17, 1940 |
| 2,241,632 | Claytor | May 13, 1941 |
| 2,243,111 | McFarland | May 27, 1941 |
| 2,257,674 | Dunn | Sept. 30, 1941 |
| 2,257,838 | Claytor | Oct. 7, 1941 |
| 2,264,001 | McKechnie | Nov. 25, 1941 |
| 2,322,479 | Schjolin | June 22, 1943 |

FOREIGN PATENTS

| Number | Country | Date |
|---|---|---|
| 446,400 | Great Britain | May 27, 1937 |